(12) United States Patent
Shimizu et al.

(10) Patent No.: US 9,664,981 B2
(45) Date of Patent: May 30, 2017

(54) INTEGRATED LIGHT SOURCE AND LIGHT OUTPUT CONTROL METHOD

(71) Applicant: NEC Corporation, Minato-ku, Tokyo (JP)

(72) Inventors: Takanori Shimizu, Tokyo (JP); Masashige Ishizaka, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/777,640

(22) PCT Filed: Jan. 10, 2014

(86) PCT No.: PCT/JP2014/000068
§ 371 (c)(1),
(2) Date: Sep. 16, 2015

(87) PCT Pub. No.: WO2014/155900
PCT Pub. Date: Oct. 2, 2014

(65) Prior Publication Data
US 2016/0274438 A1    Sep. 22, 2016

(30) Foreign Application Priority Data

Mar. 29, 2013 (JP) .................................. 2013-073708

(51) Int. Cl.
*G02F 1/313* (2006.01)
*G02B 6/12* (2006.01)
(Continued)

(52) U.S. Cl.
CPC ............. *G02F 1/3136* (2013.01); *G02B 6/12* (2013.01); *G02F 1/3134* (2013.01);
(Continued)

(58) Field of Classification Search
CPC ..... G02F 1/3134; G02F 1/3136; G02F 1/3137
See application file for complete search history.

(56) References Cited

U.S. PATENT DOCUMENTS 4,142,775 A * 3/1979 Ramaswamy .......... G02F 1/225
385/14
4,291,939 A * 9/1981 Giallorenzi ............. G02F 1/225
359/245
(Continued)

FOREIGN PATENT DOCUMENTS

JP    63-090884 A    4/1988
JP    06-337445 A    12/1994
(Continued)

OTHER PUBLICATIONS

T. Shimizu et al., "High Density Hybrid Integrated Light Source with a Laser Diode Array on a Silicon Optical Waveguide Platform for Inter-Chip Optical Interconnection", IEEE 8th International Conference on Group IV photonics, pp. 181-183, Sep. 2011.
(Continued)

*Primary Examiner* — Daniel Petkovsek

(57) ABSTRACT

An integrated light source includes an optical circuit (3) including at least an interference optical switch and a light emitting unit (2) outputting optical signals having the same phase to multiple input ends, and an interference optical switch (21), for example, includes an optical coupler (33*ab*) coupling or splitting and outputting optical signals input through multiple optical waveguides to a first and a second output ports, a first optical waveguide (32*a*) having one end inputting an optical signal and the other end connected to the optical coupler (33*ab*), a second optical waveguide (32*b*) having one end inputting an optical signal, the other end connected to the optical coupler (33*ab*), and the same optical path length as the first optical waveguide (32*a*), and a phase shifter (31*a*) disposed on the first optical waveguide (32*a*) and switching phase differences of an optical signal transmitted through the first optical waveguide (32*a*) according to a control signal (S21).

20 Claims, 5 Drawing Sheets

(51) Int. Cl.
*H04B 10/00* (2013.01)
*G02B 6/293* (2006.01)

(52) U.S. Cl.
CPC ............ *G02F 1/3137* (2013.01); *H04B 10/00* (2013.01); *G02B 6/2935* (2013.01)

(56) References Cited

U.S. PATENT DOCUMENTS

| | | | | |
|---|---|---|---|---|
| 5,247,594 | A * | 9/1993 | Okuno | G02B 6/125 385/16 |
| 5,568,575 | A * | 10/1996 | Sato | G02B 6/4249 385/16 |
| 5,653,008 | A * | 8/1997 | Sim | G02F 1/011 29/600 |
| 8,649,643 | B2 * | 2/2014 | Jeong | G02B 6/12 385/39 |
| 2006/0072866 | A1 * | 4/2006 | Mizuno | G02B 6/12007 385/1 |

FOREIGN PATENT DOCUMENTS

| | | |
|---|---|---|
| JP | 07-154325 A | 6/1995 |
| JP | 2004-078002 A | 3/2004 |
| JP | 2011-154332 A | 8/2011 |

OTHER PUBLICATIONS

T. Shimizu et al., Multi-channel and high-density hybrid integrated light source on silicon optical waveguide platform, Communication and Photonics Conference (ACP) Technical Digest, 2012, 1-3.
International Search Report for PCT Application No. PCT/JP2014/000068, mailed on Apr. 15, 2014.
English translation of Written opinion for PCT Application No. PCT/JP2014/000068.

* cited by examiner

FIG. 4

| PATH | INPUT CHANNEL CH | PHASE SHIFTER 31 | PORT 34 |
|---|---|---|---|
| a | Po | 0 | Po |
| b | Po | - | Po |

| PATH | INPUT CHANNEL CH | PHASE SHIFTER 31 | PORT 34 |
|---|---|---|---|
| a | Po | $\pi/2$ | 2Po |
| b | Po | - | 0 |

| PATH | INPUT CHANNEL CH | PHASE SHIFTER 31 | PORT 34 |
|---|---|---|---|
| a | Po | $-\pi/2$ | 0 |
| b | Po | - | 2Po |

FIG. 5

| PATH | INPUT CHANNEL CH | PHASE SHIFTER 31 | PORT 34 | PHASE SHIFTER 41 | PORT 44 |
|---|---|---|---|---|---|
| a | Po | 0 | Po | 0 | Po |
| b | Po | - | Po | - | Po |
| c | Po | 0 | Po | - | Po |
| d | Po | - | Po | 0 | Po |

FIG. 6

| PATH | INPUT CHANNEL CH | PHASE SHIFTER 31 | PORT 34 | PHASE SHIFTER 41 | PORT 44 |
|---|---|---|---|---|---|
| a | Po | $\pi/2$ | 2Po | 0 | 2Po |
| b | Po | - | 0 | - | 2Po |
| c | Po | $\pi/2$ | 2Po | - | 0 |
| d | Po | - | 0 | 0 | 0 |

| PATH | INPUT CHANNEL CH | PHASE SHIFTER 31 | PORT 34 | PHASE SHIFTER 41 | PORT 44 |
|---|---|---|---|---|---|
| a | Po | 0 | Po | $\pi/2$ | 2Po |
| b | Po | - | Po | - | 0 |
| c | Po | 0 | Po | - | 2Po |
| d | Po | - | Po | $-\pi/2$ | 0 |

| PATH | INPUT CHANNEL CH | PHASE SHIFTER 31 | PORT 34 | PHASE SHIFTER 41 | PORT 44 |
|---|---|---|---|---|---|
| a | Po | 0 | Po | $\pi/2$ | 2Po |
| b | Po | - | Po | - | 0 |
| c | Po | 0 | Po | - | 0 |
| d | Po | - | Po | $\pi/2$ | 2Po |

| PATH | INPUT CHANNEL CH | PHASE SHIFTER 31 | PORT 34 | PHASE SHIFTER 41 | PORT 44 |
|---|---|---|---|---|---|
| a | Po | 0 | Po | $-\pi/2$ | 0 |
| b | Po | - | Po | - | 2Po |
| c | Po | 0 | Po | - | 2Po |
| d | Po | - | Po | $-\pi/2$ | 0 |

| PATH | INPUT CHANNEL CH | PHASE SHIFTER 31 | PORT 34 | PHASE SHIFTER 41 | PORT 44 |
|---|---|---|---|---|---|
| a | Po | $-\pi/2$ | 0 | 0 | 0 |
| b | Po | - | 2Po | - | 0 |
| c | Po | $-\pi/2$ | 0 | - | 2Po |
| d | Po | - | 2Po | 0 | 2Po |

| PATH | INPUT CHANNEL CH | PHASE SHIFTER 31 | PORT 34 | PHASE SHIFTER 41 | PORT 44 |
|---|---|---|---|---|---|
| a | Po | 0 | Po | $-\pi/2$ | 0 |
| b | Po | - | Po | - | 2Po |
| c | Po | 0 | Po | - | 0 |
| d | Po | - | Po | $\pi/2$ | 2Po |

FIG. 7

| PATH | INPUT CHANNEL CH | PHASE SHIFTER 31 | PORT 34 | PHASE SHIFTER 41 | PORT 44 |
|---|---|---|---|---|---|
| a | Po | $\pi/2$ | 2Po | $\pi/2$ | 4Po |
| b | Po | — | 0 | — | 0 |
| c | Po | $\pi/2$ | 2Po | — | 0 |
| d | Po | — | 0 | 0 | 0 |

| PATH | INPUT CHANNEL CH | PHASE SHIFTER 31 | PORT 34 | PHASE SHIFTER 41 | PORT 44 |
|---|---|---|---|---|---|
| a | Po | $\pi/2$ | 2Po | $-\pi/2$ | 0 |
| b | Po | — | 0 | — | 4Po |
| c | Po | $\pi/2$ | 2Po | — | 0 |
| d | Po | — | 0 | 0 | 0 |

| PATH | INPUT CHANNEL CH | PHASE SHIFTER 31 | PORT 34 | PHASE SHIFTER 41 | PORT 44 |
|---|---|---|---|---|---|
| a | Po | $-\pi/2$ | 0 | 0 | 0 |
| b | Po | — | 2Po | — | 0 |
| c | Po | $-\pi/2$ | 0 | — | 4Po |
| d | Po | — | 2Po | $-\pi/2$ | 0 |

| PATH | INPUT CHANNEL CH | PHASE SHIFTER 31 | PORT 34 | PHASE SHIFTER 41 | PORT 44 |
|---|---|---|---|---|---|
| a | Po | $-\pi/2$ | 0 | 0 | 0 |
| b | Po | — | 2Po | — | 0 |
| c | Po | $-\pi/2$ | 0 | — | 0 |
| d | Po | — | 2Po | $\pi/2$ | 4Po |

INTEGRATED LIGHT SOURCE AND LIGHT OUTPUT CONTROL METHOD

This application is a National Stage Entry of PCT/JP2014/000068 filed on Jan. 10, 2014, which claims priority from Japanese Patent Application 2013-073708 filed on Mar. 29, 2013, the contents of all of which are incorporated herein by reference, in their entirety.

TECHNICAL FIELD

The present invention relates to an integrated light source and a light output control method thereof, which are used in optical interconnection and optical communication.

BACKGROUND ART

As the amount of data processed by computer devices or the like increases, data transmission using electrical signals has been replaced with data transmission using optical signals. For example, some of transceivers, other various devices and apparatuses, or the like carry out transmission and reception of data (signal) by using optical signals. In recent years, development of a technology, referred to as silicon photonics, in which a transmission unit, a reception unit, an optical wiring unit of such devices and apparatuses are formed on a silicon substrate has advanced.

An example of an integrated light source that is formed on a silicon substrate is disclosed in PTL 1. In PTL 1, an optical component is disclosed that includes a first optical waveguide, a second optical waveguide that is optically-coupled with the first optical waveguide through a first optical coupler and a second optical coupler individually and composes a Mach-Zehnder interferometer with the first optical waveguide, a first heater that is disposed on at least one of the first optical waveguide and the second optical waveguide between the first optical coupler and the second optical coupler, and a semiconductor laser that is optically-coupled with an input end of the first optical waveguide, and in which the first and the second optical waveguides, the first heater, and the semiconductor laser are integrated on an identical substrate. With such a configuration, the optical component in PTL 1 is capable of achieving more light output that enables power control as desired with a small number of semiconductor lasers used.

Another example of the integrated light source formed on a silicon substrate is disclosed in NPL 1. In NPL 1, a structure of a hybrid integrated light source in which a laser diode array with a high output power is mounted on a silicon wire waveguide platform is disclosed. The integrated light source disclosed in NPL 1 has a transmission unit that employs an external modulation system, making it possible to use CW (Continuous Wave) light and form a laser diode array having a single electrode, and, thus, it is possible to narrow the pitch of a laser diode array to one-tenth or narrower, compared with a case in which each laser diode is individually driven as in conventional cases (for example, a laser diode array formed under the assumption of optical fiber connection has a pitch of 250 to 300 μm).

CITATION LIST

Patent Literature

PTL 1: Japanese Unexamined Patent Application Publication No. 2004-78002

Non-Patent Literature

NPL 1: T. Shimizu et al., "High Density Hybrid Integrated Light Source with a Laser Diode Array on a Silicon Optical Waveguide Platform for Inter-Chip Optical Interconnection", IEEE 8th International Conference on Group IV photonics, pp. 181-183, September, 2011

SUMMARY OF INVENTION

Technical Problem

In applying optical interconnection, while all channels are continuously driven sometimes, there is a case in which optical wiring is multiplexed to improve a reliability in the optical wiring or the frequency of use with respect to each channel changes temporally. From the viewpoint of power consumption, it is preferable not to consume power at a channel except when the channel is used.

However, for a conventional laser diode array that performs multi-channel simultaneous driving by use of a single electrode, there is a problem in that, even when only a partial and desirable number of channels are used, light is also output to the other unused channels, causing power consumption to increase by the amount of power consumption at the unused channels.

The present invention is made in consideration of the above-described problem, and an object of the present invention is to provide an integrated light source that enables a reduction in power consumption.

Solution to Problem

An aspect of an integrated light source according to the present invention includes an optical circuit that includes at least an interference optical switch that, based on optical signals that are input from a plurality of input ends, outputs the optical signals from at least an output port, and a light emitting unit that outputs optical signals having the same phase to the plurality of input ends, wherein the interference optical switch includes an optical coupler that couples or splits the optical signals that are input through a plurality of optical waveguides and outputs the coupled or split optical signals to a first and a second output ports, a first optical waveguide from one end of which the optical signal is input and the other end of which is connected to the optical coupler, a second optical waveguide from one end of which the optical signal is input, the other end of which is connected to the optical coupler, and that has the same optical path length as the first optical waveguide, and a phase shifter that is disposed on the first optical waveguide and, in accordance with a control signal, switches phase differences of the optical signal that is transmitted through the first optical waveguide.

An aspect of a light output control method according to the present invention is a light output control method for an integrated light source that includes an optical circuit that includes at least an interference optical switch that, based on optical signals that are input from a plurality of input ends, outputs the optical signals from at least an output port, and a light emitting unit that outputs optical signals having the same phase to the plurality of input ends, wherein the interference optical switch includes an optical coupler that couples or splits the optical signals that are input through a plurality of optical waveguides and outputs the coupled or split optical signals to a first and a second output ports, a first optical waveguide from one end of which the optical signal is input and the other end of which is connected to the optical coupler, a second optical waveguide from one end of which the optical signal is input, the other end of which is connected to the optical coupler, and that has the same optical path length as the first optical waveguide, and a phase shifter that is disposed on the first optical waveguide and, in accordance with a control signal, switches phase differences of the optical signal that is transmitted through the first optical waveguide, and, when the optical signals are output from a portion of the plurality of output ports by the phase shifters giving phase differences to the optical signals, output power of the optical signals at the light emitting unit is decreased in accordance with a decrease in the number of the output ports that output the optical signals.

Advantageous Effects of Invention

An integrated light source and a light output control method thereof according to the present application are capable of providing an integrated light source that enables a reduction in power consumption.

BRIEF DESCRIPTION OF DRAWINGS

FIG. 4 is a table illustrating relations between phases at a phase shifter and the intensity of optical signals to be output in an interference optical switch in the integrated light source according to exemplary embodiment 1;

FIG. 5 is a table illustrating a condition for phase differences given to phase shifters when optical signals having the same intensity are output from four output ports by using four interference optical switches in the integrated light source according to exemplary embodiment 1;

FIG. 6 is a table illustrating conditions for phase differences given to the phase shifters when optical signals having twice the intensity of input optical signals are output from two output ports and optical signals output from the other output ports are cut off by using four interference optical switches in the integrated light source according to exemplary embodiment 1; and FIG. 7 is a table illustrating conditions for phase differences given to the phase shifters when an optical signal having four times the intensity of input optical signals is output from an output port and optical signals output from the other output ports are cut off by using four interference optical switches in the integrated light source according to exemplary embodiment 1.

DESCRIPTION OF EMBODIMENTS

Exemplary Embodiment 1

Figure 1:
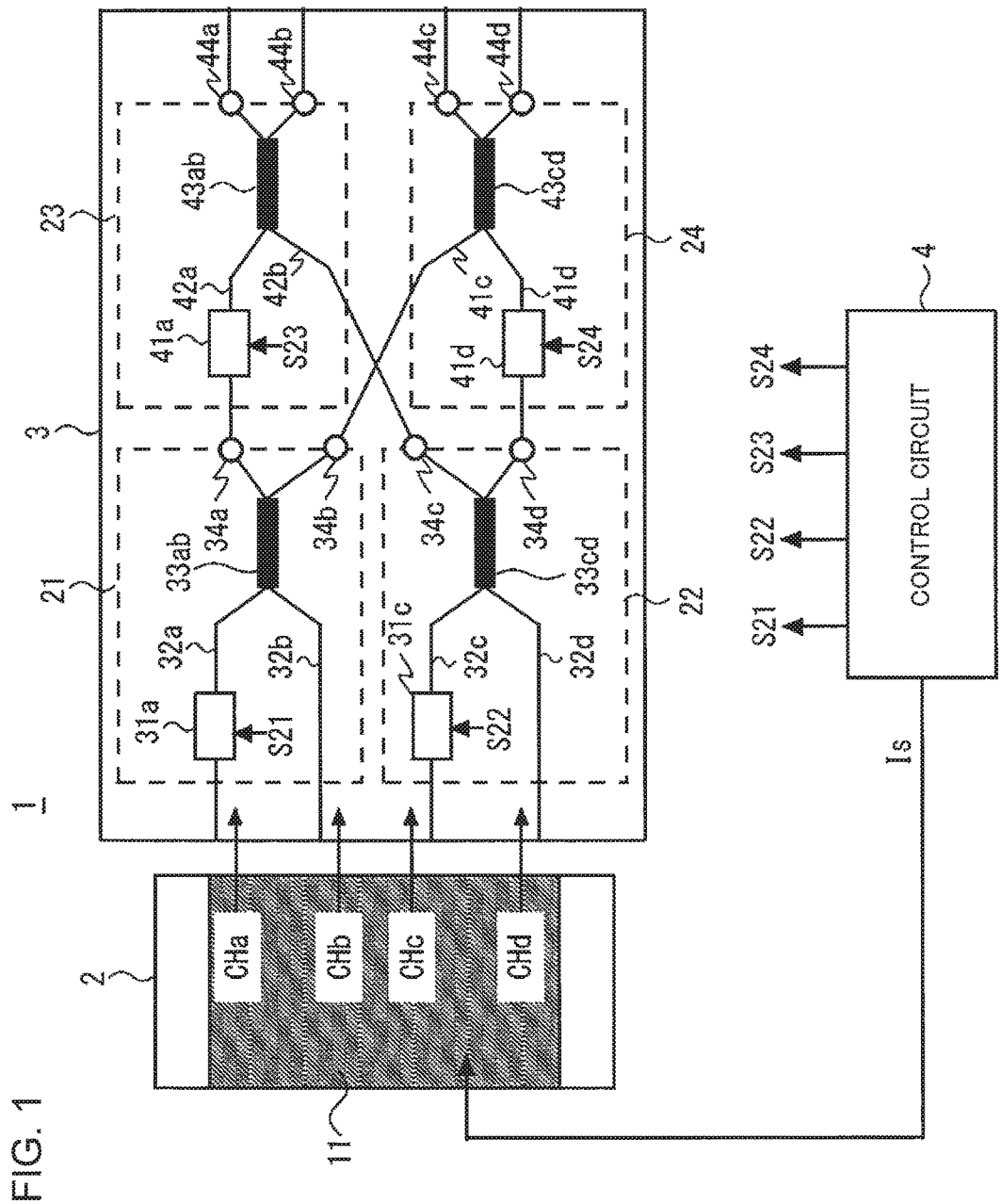
FIG. 1 is a block diagram of an integrated light source according to exemplary embodiment 1.

An exemplary embodiment of the present invention will be described below with reference to the accompanying drawings. FIG. 1 is a block diagram illustrating an integrated light source 1 according to exemplary embodiment 1. As illustrated in FIG. 1, the integrated light source 1 includes a light emitting unit (for example, a laser diode array 2), an optical circuit 3, and a control circuit 4.

The laser diode array 2 includes a multi-channel laser diode and outputs optical signals having the same phase to a plurality of input ends of the optical circuit 3. The multi-channel laser diode includes an active layer and an electrode 11. The active layer is formed with a multimode waveguide or a multimode interference waveguide, and the number of channels vary depending on a cavity length and a waveguide width of the active layer. Due to such a condition, regarding the active layer, the cavity length and the width of the active layer are adjusted in accordance with the number of channels of the optical circuit 3. In FIG. 1, a case in which the optical circuit 3 has four channels is illustrated, and the laser diode array 2 outputs optical signals having the same phase to channels CHa, CHb, CHc, and CHd. An optical signal that the laser diode array 2 outputs is continuous wave light. The laser diode array 2 changes the intensity of the optical signal in accordance with the magnitude of a driving current Is that the control circuit 4 outputs.

The optical circuit 3 includes at least an interference optical switch that, based on optical signals input from a plurality of input ends, outputs the optical signals from at least an output port. In the integrated light source 1 according to exemplary embodiment 1 illustrated in FIG. 1, interference optical switches 21 to 24 are included, and four channels are formed with the four interference optical switches. The following description will be made by using a to d as signs to identify channels.

Each of the interference optical switches 21 to 24 has two channels. The interference optical switches of the optical circuit 3 are configured into two stages. More specifically, the optical circuit 3 uses the interference optical switches 21 and 22 as a first and a second interference optical switches that receive optical signals from the laser diode array 2. The optical circuit 3 uses the interference optical switch 23 as a third interference optical switch that receives the optical signals from a first output port of the first interference optical switch and a first output port of the second interference optical switch and outputs the optical signals to a succeeding circuit. The optical circuit 3 uses the interference optical switch 24 as a fourth interference optical switch that receives the optical signals from a second output port of the first interference optical switch and a second output port of the second interference optical switch and outputs the optical signals to the succeeding circuit.

Each of the interference optical switches 21 to 24 has a first optical waveguide, a second optical waveguide, an optical coupler, and a phase shifter. The first optical waveguide has one end from which an optical signal is input and the other end that is connected to the optical coupler. The second optical waveguide has one end from which an optical signal is input and the other end that is connected to the optical coupler, and has the same optical path length as the first optical waveguide. The optical path length means the length of a waveguide required for an input optical signal to reach the optical coupler in the same phase. The optical coupler couples or splits optical signals that are input through a plurality of optical waveguides and outputs the coupled or split optical signals to a first and a second output ports. The phase shifter is disposed on the first optical waveguide and switches phase differences of an optical signal that is transmitted through the first optical waveguide in accordance with a control signal. The control signal is a signal that the control circuit 4, which will be described later, outputs.

A specific configuration of the interference optical switch of exemplary embodiment 1 will be described below in more detail. Although, in FIG. 1, the output ports of each interference optical switch are drawn at positions having distances from the optical coupler for the purpose of illustration, the output ports of the interference optical switch are formed in one body with the optical coupler, and it may thus be assumed that the optical path lengths from the output end of the optical coupler to the output ports are practically zero. The assumption about the optical path lengths between the output ports and the output end of the optical coupler may be applied to other drawings in the same manner.

The interference optical switch 21 includes a phase shifter 31a, optical waveguides 32a and 32b, an optical coupler 33ab, and output ports 34a and 34b. The optical waveguide 32a corresponds to the first optical waveguide. The first optical waveguide 32a has one end to which an optical signal output from the laser diode array 2 is input and the other end that is connected to the optical coupler 33ab. The optical waveguide 32b corresponds to the second optical waveguide. The second optical waveguide 32b has one end to which an optical signal output from the laser diode array 2 is input and the other end that is connected to the optical coupler 33ab. The optical coupler 33ab bundles together the optical waveguide 32a and the optical waveguide 32b, couples or splits the optical signals transmitted through the two optical waveguides in accordance with the phase difference between the optical signals, and outputs the coupled or split optical signals to the first output port 34a and the second output port 34b. The phase shifter 31a is arranged on the first optical waveguide 32a. The phase shifter 31a, in accordance with the value of a control signal S21 output from the control circuit 4, changes the phase difference between the optical signal transmitted through the first optical waveguide 32a and the optical signal transmitted through the second optical waveguide 32b.

The interference optical switch 22 includes a phase shifter 31c, optical waveguides 32c and 32d, an optical coupler 33cd, and output ports 34c and 34d. The optical waveguide 32c corresponds to the first optical waveguide. The first optical waveguide 32c has one end to which an optical signal output from the laser diode array 2 is input and the other end that is connected to the optical coupler 33cd. The optical waveguide 32d corresponds to the second optical waveguide. The second optical waveguide 32d has one end to which an optical signal output from the laser diode array 2 is input and the other end that is connected to the optical coupler 33cd. The optical coupler 33cd bundles together the optical waveguide 32c and the optical waveguide 32d, couples or splits the optical signals transmitted thorough the two optical waveguides in accordance with the phase difference between the optical signals, and outputs the coupled or split optical signals to the first output port 34c and the second output port 34d. The phase shifter 31c is arranged on the first optical waveguide 32c. The phase shifter 31c, in accordance with the value of a control signal S22 output from the control circuit 4, changes the phase difference between the optical signal transmitted through the first optical waveguide 32c and the optical signal transmitted through the second optical waveguide 32d.

The interference optical switch 23 includes a phase shifter 41a, optical waveguides 42a and 42b, an optical coupler 43ab, and output ports 44a and 44b. The optical waveguide 42a corresponds to the first optical waveguide. The first optical waveguide 42a has one end to which the optical signal output from the first output port 34a of the interference optical switch 21 is input and the other end that is connected to the optical coupler 43ab. The optical waveguide 42b corresponds to the second optical waveguide. The second optical waveguide 42b has one end to which the optical signal output from the first output port 34c of the interference optical switch 22 is input and the other end that is connected to the optical coupler 43ab. The optical coupler 43ab bundles together the optical waveguide 42a and the optical waveguide 42b, couples or splits the optical signals transmitted through the two optical waveguides in accordance with the phase difference between the optical signals, and outputs the coupled or split optical signals to the first output port 44a and the second output port 44b. The phase shifter 41a is arranged on the first optical waveguide 42a. The phase shifter 41a, in accordance with the value of a control signal S23 output from the control circuit 4, changes the phase difference between the optical signal transmitted through the first optical waveguide 42a and the optical signal transmitted through the second optical waveguide 42b.

The interference optical switch 24 includes a phase shifter 41d, optical waveguides 42c and 42d, an optical coupler 43cd, and output ports 44c and 44d. The optical waveguide 42c corresponds to the first optical waveguide. The first optical waveguide 42c has one end to which the optical signal output from the second output port 34b of the interference optical switch 21 is input and the other end that is connected to the optical coupler 43cd. The optical waveguide 42d corresponds to the second optical waveguide. The second optical waveguide 42d has one end to which the optical signal output from the second output port 34d of the interference optical switch 22 is input and the other end that is connected to the optical coupler 43cd. The optical coupler 43cd bundles together the optical waveguide 42c and the optical waveguide 42d, couples or splits the optical signals transmitted through the two optical waveguides in accordance with the phase difference between the optical signals, and outputs the coupled or split optical signals to the first output port 44c and the second output port 44d. The phase shifter 41d is arranged on the second optical waveguide 42d. The phase shifter 41d, in accordance with the value of a control signal S24 output from the control circuit 4, changes the phase difference between the optical signal transmitted through the first optical waveguide 42c and the optical signal transmitted through the second optical waveguide 42d.

In the optical circuit 3 according to exemplary embodiment 1, a multi-stage circuit having two stages is formed with the interference optical switches 21 to 24. More specifically, in the optical circuit 3, the optical signal output from the first output port 34a of the interference optical switch 21 is fed to one end of the first optical waveguide 42a of the interference optical switch 23. In the optical circuit 3, the optical signal output from the first output port 34c of the interference optical switch 22 is fed to one end of the second optical waveguide 42b of the interference optical switch 23. In the optical circuit 3, the optical signal output from the second output port 34b of the interference optical switch 21 is fed to one end of the first optical waveguide 42c of the interference optical switch 24. In the optical circuit 3, the optical signal output from the second output port 34d of the interference optical switch 22 is fed to one end of the second optical waveguide 42d of the interference optical switch 24. In other words, in the optical circuit 3 according to exemplary embodiment 1, the second optical waveguide 42b of the interference optical switch 23 and the first optical waveguide 42c of the interference optical switch 24, which are arranged in the second stage, are arranged to cross each other is one of the characteristics thereof.

As described above, in the optical circuit 3 according to exemplary embodiment 1, the waveguides of the respective interference optical switches have the same optical path length. In other words, the first optical waveguide 32a and the second optical waveguide 32b, the first optical waveguide 32c and the second optical waveguide 32d, the first optical waveguide 42a and the second optical waveguide 42b, and the first optical waveguide 42c and the second optical waveguide 42d have the same optical path length, respectively. The first optical waveguide 32a, the first optical waveguide 32c, the first optical waveguide 42a, and the second optical waveguide 42d have phase shifters, which have a phase adjustment function, respectively. With such a configuration, even when the waveguides have different physical lengths due to production variation, it is also possible to adjust the optical path lengths of the waveguides by the phase shifters. As a method of phase adjustment, a method to use a thermo-optical effect by arranging a heater to a waveguide, a method to use an electro-optical effect by using an electro-optical material, a method to use a carrier-plasma effect by doping impurity carriers, or the like may be usable, and any other method that has a phase adjustment function is appropriately usable.

In the optical circuit 3 according to exemplary embodiment 1, each of the optical couplers 33ab, 33cd, 43ab, and 43cd is an optical coupler that has two inputs and two outputs (hereinafter, referred to as 2×2 type), and may be either a directional coupler or a multi-mode interferometer type optical coupler.

Figure 2:
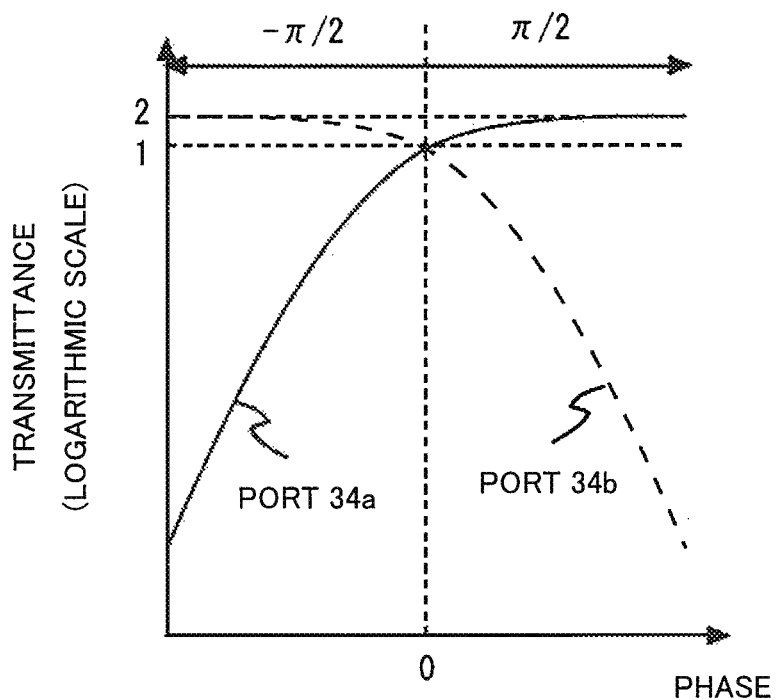
FIG. 2 is a graph illustrating output characteristics of an interference optical switch according to exemplary embodiment 1.

Next, an operation of the integrated light source 1 according to exemplary embodiment 1 will be described. First, a graph illustrating output characteristics of the interference optical switch used in the integrated light source 1 according to exemplary embodiment 1 is illustrated in FIG. 2. Although the graph illustrated in FIG. 2 illustrates output characteristics of the interference optical switch 21, other interference optical switches have the same characteristics.

As illustrated in FIG. 2, when the phase difference between two optical signals is zero, the interference optical switch 21 outputs optical signals having the same intensity to the first output port 34a and the second output port 34b. When the phase shifter 31a gives a phase shift of $\pi/2$ to the optical signal transmitted through the first optical waveguide 32a, the interference optical switch 21 outputs an optical signal having twice the intensity of the input optical signal to the first output port 34a and an optical signal of practically zero to the second output port 34b. When the phase shifter 31a gives a phase shift of $-\pi/2$ to the optical signal transmitted through the first optical waveguide 32a, the interference optical switch 21 outputs an optical signal having twice the intensity of the input optical signal to the second output port 34b and an optical signal of practically zero to the first output port 34a.

Figure 3:
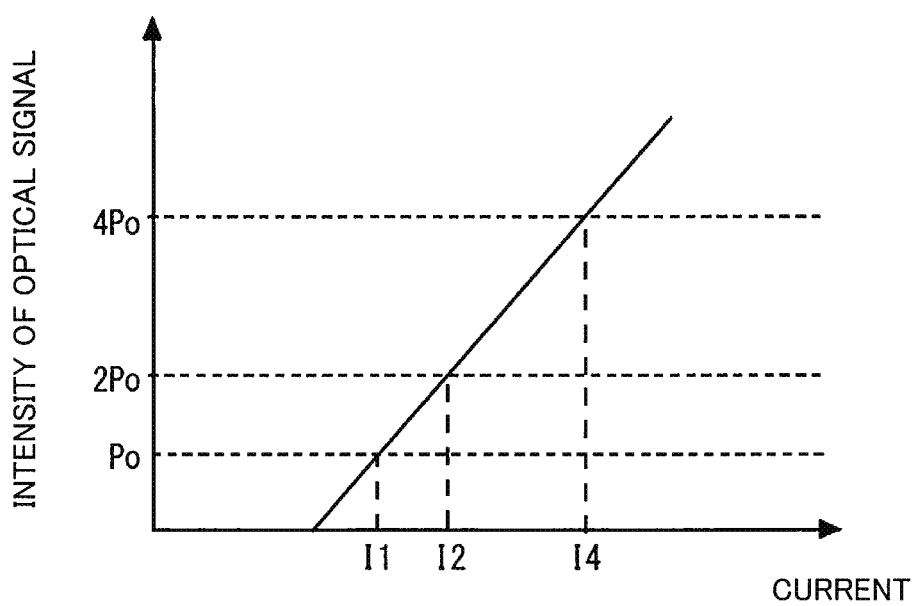
FIG. 3 is a graph illustrating output characteristics of a light emitting unit according to exemplary embodiment 1.

Next, a graph illustrating output characteristics of all channels of the laser diode array 2 in the integrated light source 1 according to exemplary embodiment 1 in total is illustrated in FIG. 3. As illustrated in FIG. 3, the laser diode array 2 increases the intensity of optical signals in proportion to the magnitude of the driving current Is.

Next, by using FIGS. 4 to 7, operations of the integrated light source 1 according to exemplary embodiment 1 will be described. FIG. 4 is a table illustrating relations between inputs and outputs of an interference optical switch (for example, the interference optical switch 21). In the following description, both the first output port and the second output port are simply referred to as output port, and signs a to d in reference signs distinguish the channels.

As illustrated in FIG. 4, when the phase difference given to the phase shifter 31 is zero, optical signals having the same intensity as the optical signals input from the channels CHa and CHb are output from the output ports 34a and 34b. When the phase difference given to the phase shifter 31 is $\pi/2$, an optical signal having twice the intensity of the optical signals input from the channels CHa and CHb is output from the output port 34a, and an optical signal output from the output port 34b is cut off. When the phase difference given to the phase shifter 31 is $-\pi/2$, an optical signal having twice the intensity of the optical signals input from the channels CHa and CHb is output from the output port 34b, and an optical signal output from the output port 34a is cut off.

FIG. 5 is a table illustrating a condition for phase differences that are given to the phase shifters in outputting optical signals having the same intensity from four output ports (for example, the output ports 44a to 44d) by using four interference optical switches (for example, the interference optical switches 21 to 24).

As illustrated in FIG. 5, the integrated light source 1 according to exemplary embodiment 1 outputs optical signals having the same intensity as the input optical signals to the output ports 44a to 44d by setting the phase differences given to both the phase shifters 31a and 31c and the phase shifters 41a and 41d at zero. All optical signals output to the output ports 44a to 44d have the same intensity.

FIG. 6 is a table illustrating conditions for phase differences that are given to the phase shifters in outputting optical signals having twice the intensity of the input optical signals from two output ports and cutting off optical signals output from the other output ports by using four interference optical switches (for example, the interference optical switches 21 to 24).

As illustrated in FIG. 6, the integrated light source 1 according to exemplary embodiment 1 outputs optical signals having twice the intensity of the input optical signals from two output ports of the output ports of the interference optical switches 21 and 22, which are arranged in the first stage, by setting the phase differences given to the phase shifters 31a and 31c of the interference optical switches 21 and 22, which are arranged in the first stage, at $\pi/2$ or $-\pi/2$. In this case, by setting the phase differences given to the phase shifters 41a and 41d of the interference optical switches 23 and 24, which are arranged in the second stage, at zero, optical signals having the intensity maintained at the intensity of the optical signals output from the output ports of the interference optical switches 21 and 22, which are arranged in the first stage, are output from any two output ports of the output ports 44a to 44d.

As illustrated in FIG. 6, the integrated light source 1 according to exemplary embodiment 1 outputs optical signals having the same intensity as the input optical signals from four output ports of the interference optical switches 21 and 22, which are arranged in the first stage, by setting the phase differences given to the phase shifters 31a and 31c of the interference optical switches 21 and 22, which are arranged in the first stage, at zero. In this case, by setting the phase differences given to the phase shifters 41a and 41d of the interference optical switches 23 and 24, which are arranged in the second stage, at $\pi/2$ or $-\pi/2$, optical signals having twice the intensity of the input optical signals are output from any two output ports of the output ports 44a to 44d.

FIG. 7 is a table illustrating conditions for phase differences given to the phase shifters in outputting an optical signal having four times the intensity of the input optical signals from an output port and cutting off optical signals output from the other output ports by using four interference optical switches (for example, the interference optical switches 21 to 24).

As illustrated in FIG. 7, the integrated light source 1 according to exemplary embodiment 1 gives phase differences of $\pi/2$ or $-\pi/2$ to the phase shifters 31a and 31c of the interference optical switches 21 and 22, which are arranged in the first stage, a phase difference of $\pi/2$ or $-\pi/2$ to one of the phase shifters 41a and 41d of the interference optical switches 23 and 24, which are arranged in the second stage, and a phase difference of zero to the other of the phase shifters 41a and 41d. By giving such phase differences to the phase shifters, the integrated light source 1 according to exemplary embodiment 1 outputs an optical signal having four times the intensity of the input optical signals from any one of the output ports 44a to 44d.

As described above, the integrated light source 1 according to exemplary embodiment 1 is capable of outputting optical signals having a higher intensity than optical signals output by the laser diode array 2 from a portion of the ports by controlling phase differences given to the phase shifters. By using such output characteristics, the integrated light source 1 according to exemplary embodiment 1 is, for example, in outputting an optical signal from one output port, capable of reducing the power of the input optical signal to a quarter. In this way, reducing the intensity of an optical signal output by the optical circuit 3 to a quarter, that is, from 4×P0 to P0, is achievable by decreasing a current value from I4 to I1 (refer to FIG. 3). When the number of output ports to output optical signals is 2, reducing the power of optical signals output by the optical circuit 3 to a half, that is, from 2×P0 to P0, is achievable by decreasing the current value from I2 to I1 (refer to FIG. 3).

In other words, the integrated light source 1 according to exemplary embodiment 1 increases or decreases the driving current Is in accordance with the number of output ports to output optical signals by the control signal that the control circuit 4 gives the phase shifters. In this way, the integrated light source 1 according to exemplary embodiment 1 makes it possible to reduce power consumption by decreasing the driving current Is in accordance with the number of output ports to output optical signals while maintaining the intensity of output optical signals constant.

In conventional technologies (for example, a technology disclosed in PTL 1 or the like), a semiconductor laser functioning as a light emitting unit is required to output an optical signal that has a signal intensity equivalent to the intensity required for a channel at a minimum, and incapable of decreasing the output power to the intensity required for a channel or less. However, in the integrated light source 1 according to exemplary embodiment 1, it is sufficient for the laser diode array 2 to output optical signals having an intensity equivalent to the intensity required for a channel at a maximum, and, in a case of decreasing the number of output ports to output optical signals, it is possible to set the intensity of optical signals given to the optical circuit 3 at the signal intensity equivalent to the intensity required for a channel or less.

Although a case in which the laser diode array 2 with four channels is used and the optical circuit 3 with four inputs and four outputs is configured was described in the above description, exemplary embodiment 1 can be applied to a case of the greater number of channels in a similar manner. For example, since, for $2^n$ (n is a natural number) inputs, the power becomes P0 for each of $2^n$ outputs, two times P0 for each of $2^{n-1}$ outputs, and $2^n$ times P0 for an output, it is possible to decrease the current value so as to set the output at P0.

In the integrated light source 1 according to exemplary embodiment 1, since a multi-channel laser diode that outputs optical signals having the same phase is used, it is possible to switch paths without producing combining loss at optical couplers, making it possible to form a small optical circuit. Since it is possible to decrease a current through the multi-channel laser diode in accordance with the number of output ports in outputting optical signals to only required ports, it is possible to reduce power consumption even when all channels of the multi-channel laser diode are operating.

The present invention was described above through an exemplary embodiment thereof, but the present invention is not limited to the above exemplary embodiment. Various modifications that could be understood by a person skilled in the art may be applied to the configurations and details of the present invention within the scope of the present invention.

This application claims priority based on Japanese Patent Application No. 2013-073708, filed on Mar. 29, 2013, the entire disclosure of which is incorporated herein by reference.

REFERENCE SIGNS LIST

1 Integrated light source
2 Laser diode array
3 Optical circuit
4 Control circuit
11 Electrode
21 to 24 Interference optical switch
31a and 31c Phase shifter
32a to 32d Optical waveguide
33ab and 33cd Optical coupler
34a to 34d Output port
41a and 41d Phase shifter
42a to 42d Optical waveguide
43ab and 43cd Optical coupler
44a to 44d Output port
CHa to CHd Channel

What is claimed is:

1. An integrated light source, comprising:
   an optical circuit that includes at least an interference optical switch for, based on optical signals that are input from a plurality of input ends, outputting the optical signals from at least an output port; and
   a light emitting unit for outputting optical signals that have the same phase to the plurality of input ends,
   wherein the interference optical switch comprises:
      an optical coupler for coupling or splitting the optical signals that have the same phase and are input through a plurality of optical waveguides and outputting the coupled or split optical signals to a first and a second output ports;
      a first optical waveguide from one end of which the optical signal is input and the other end of which is connected to the optical coupler;
      a second optical waveguide from one end of which the optical signal is input, the other end of which is connected to the optical coupler, and that has the same optical path length as the first optical waveguide; and
      a phase shifter that is arranged on the first optical waveguide and, in accordance with a control signal, changes phase differences between the optical signal transmitted through the first optical waveguide and the optical signal transmitted through the second optical waveguide.

2. The integrated light source according to claim 1, wherein the light emitting unit comprises a multi-channel laser diode that outputs the optical signals that have the same phase, and an active layer of the multi-channel laser diode comprises a multimode waveguide or a multimode interference waveguide.

3. The integrated light source according to claim 2, wherein the optical circuit comprises a plurality of the interference optical switches, the plurality of interference optical switch comprising:
a first and a second interference optical switch for receiving the optical signals from the light emitting unit;
a third interference optical switch for receiving the optical signals from a first output port of the first interference optical switch and a first output port of the second interference optical switch and outputting the optical signals to a succeeding circuit; and
a fourth interference optical switch for receiving the optical signals from a second output port of the first interference optical switch and a second output port of the second interference optical switch and outputting the optical signals to the succeeding circuit.

4. The integrated light source according to claim 3 further comprising:
a control circuit for outputting the control signal, wherein the control circuit outputs the control signal that sets a phase difference of the optical signal that is transmitted through the first optical waveguide to zero compared to the optical signal that is transmitted through the second optical waveguide to the phase shifter, and the plurality of output ports of the interference optical switch output optical signals that have the same intensity.

5. The integrated light source according to claim 3, further comprising:
a control circuit for outputting the control signal, wherein the control circuit outputs the control signal that sets a phase difference of the optical signal that is transmitted through the first optical waveguide to $\pi/2$ or $-\pi/2$ compared to the optical signal that is transmitted through the second optical waveguide to the phase shifter, and one of the plurality of output ports of the interference optical switch outputs optical signal that has twice the intensity of optical signals that are input to the one ends of the first and the second optical waveguide.

6. The integrated light source according to claim 5, wherein the control circuit reduces, by the control signal supplied to the phase shifter, the number of the output ports that output the optical signals and a current that is injected to a laser diode that outputs the optical signals in the light emitting unit.

7. The integrated light source according to claim 2 further comprising:
a control circuit for outputting the control signal, wherein the control circuit outputs the control signal that sets a phase difference of the optical signal that is transmitted through the first optical waveguide to zero compared to the optical signal that is transmitted through the second optical waveguide to the phase shifter, and the plurality of output ports of the interference optical switch output optical signals that have the same intensity.

8. The integrated light source according to claim 2, further comprising:
a control circuit for outputting the control signal, wherein the control circuit outputs the control signal that sets a phase difference of the optical signal that is transmitted through the first optical waveguide to $\pi/2$ or $-\pi/2$ compared to the optical signal that is transmitted through the second optical waveguide to the phase shifter, and one of the plurality of output ports of the interference optical switch outputs optical signal that has twice the intensity of optical signals that are input to the one ends of the first and the second optical waveguide.

9. The integrated light source according to claim 8, wherein the control circuit reduces, by the control signal supplied to the phase shifter, the number of the output ports that output the optical signals and a current that is injected to a laser diode that outputs the optical signals in the light emitting unit.

10. The integrated light source according to claim 1, wherein the optical circuit comprises a plurality of the interference optical switches, the plurality of interference optical switches comprising:
a first and a second interference optical switches for receiving the optical signals from the light emitting unit;
a third interference optical switch for receiving the optical signals from a first output port of the first interference optical switch and a first output port of the second interference optical switch and outputting the optical signals to a succeeding circuit; and
a fourth interference optical switch for receiving the optical signals from a second output port of the first interference optical switch and a second output port of the second interference optical switch and outputting the optical signals to the succeeding circuit.

11. The integrated light source according to claim 1, further comprising:
a control circuit for outputting the control signal, wherein the control circuit outputs the control signal that sets a phase difference of the optical signal that is transmitted through the first optical waveguide to zero compared to the optical signal that is transmitted through the second optical waveguide to the phase shifter, and the plurality of output ports of the interference optical switch output optical signals that have the same intensity.

12. The integrated light source according to claim 1, further comprising:
a control circuit for outputting the control signal, wherein the control circuit outputs the control signal that sets a phase difference of the optical signal that is transmitted through the first optical waveguide to $\pi/2$ or $-\pi/2$ compared to the optical signal that is transmitted through the second optical waveguide to the phase shifter, and one of the plurality of output ports of the interference optical switch outputs optical signal that has twice the intensity of optical signals that are input to the one ends of the first and the second optical waveguide.

13. The integrated light source according to claim 12, wherein the control circuit reduces, by the control signal supplied to the phase shifter, the number of the output ports that output the optical signals and a current that is injected to a laser diode that outputs the optical signals in the light emitting unit.

14. The integrated light source according to claim 10 further comprising:
a control circuit for outputting the control signal,
wherein the control circuit outputs the control signal that sets a phase difference of the optical signal that is transmitted through the first optical waveguide to zero compared to the optical signal that is transmitted through the second optical waveguide to the phase shifter, and the plurality of output ports of the interference optical switch output optical signals that have the same intensity.

15. The integrated light source according to claim 10, further comprising:
a control circuit for outputting the control signal,
wherein the control circuit outputs the control signal that sets a phase difference of the optical signal that is transmitted through the first optical waveguide to $\pi/2$ or $-\pi/2$ compared to the optical signal that is transmitted through the second optical waveguide to the phase shifter, and one of the plurality of output ports of the interference optical switch outputs optical signal that has twice the intensity of optical signals that are input to the one ends of the first and the second optical waveguide.

16. The integrated light source according to claim 15,
wherein the control circuit reduces, by the control signal supplied to the phase shifter, the number of the output ports that output the optical signals and a current that is injected to a laser diode that outputs the optical signals in the light emitting unit.

17. A light output control method for an integrated light source, the integrated light source comprising:
an optical circuit that includes at least an interference optical switch for, based on optical signals that are input from a plurality of input ends, outputting the optical signals from at least an output port; and
a light emitting unit for outputting optical signals that have the same phase to the plurality of input ends,
wherein the interference optical switch comprises:
an optical coupler for coupling or splitting the optical signals that are input through a plurality of optical waveguides and outputting the coupled or split optical signals to a first and a second output ports;
a first optical waveguide from one end of which the optical signal is input and the other end of which is connected to the optical coupler;
a second optical waveguide from one end of which the optical signal is input, the other end of which is connected to the optical coupler, and that has the same optical path length as the first optical waveguide; and
a phase shifter for being disposed on the first optical waveguide and, in accordance with a control signal, switching phase differences of the optical signal that is transmitted through the first optical waveguide, and
wherein the light output control method includes reducing, by giving phase differences to the optical signals by the phase shifter, the number of the output ports that output the optical signals and output power of the optical signals at the light emitting unit.

18. The light output control method according to claim 17, further comprising supplying the control signal to the phase shifter, the control signal setting a phase different of the optical signal that is transmitted through the first optical waveguide to $\pi/2$ or $-\pi/2$ compared to the optical signal that is transmitted through the second optical waveguide, and outputting optical signal that has twice the intensity of optical signals that are input to one ends of the first and the second optical waveguide from one of the plurality of output ports of the interference optical switch.

19. The light output control method according to claim 18, wherein the number of the output ports that output the optical signals is decreased and a current that is injected to a laser diode that outputs the optical signals in the light emitting unit.

20. The light output control method according to claim 17, further comprising reducing, by the control signal supplied to the phase shifter, the number of the output ports that output the optical signals and a current that is injected to a laser diode that outputs the optical signal in the light emitting unit.

* * * * *